No. 729,356. PATENTED MAY 26, 1903.
G. W. KING, H. J. BARNHART & C. B. KING.
BEARING.
APPLICATION FILED FEB. 7, 1903.
NO MODEL.
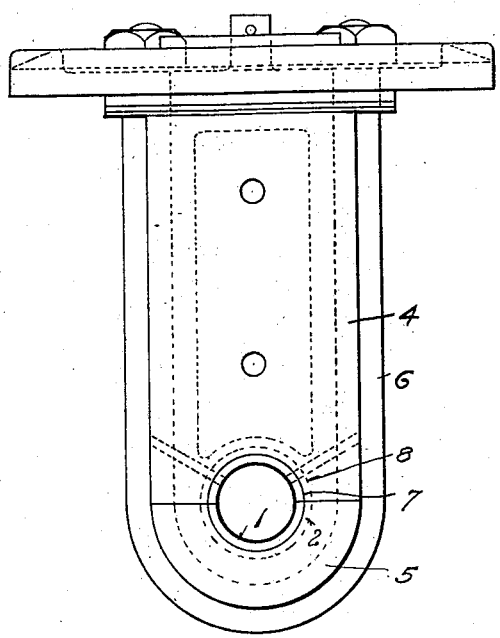
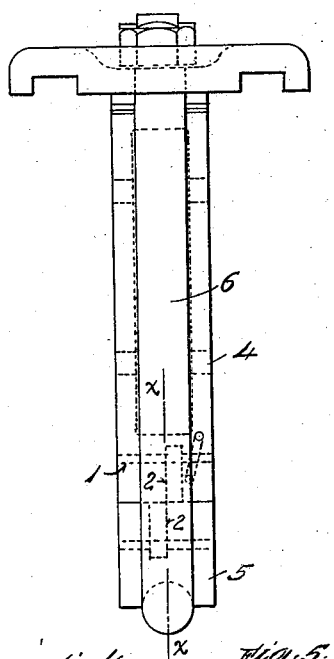
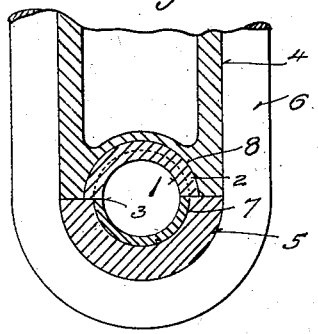
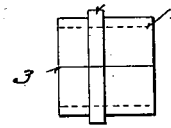
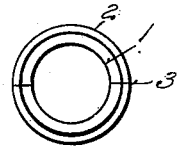
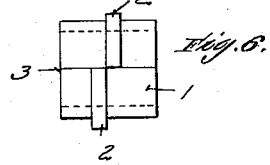

No. 729,356.

Patented May 26, 1903.

UNITED STATES PATENT OFFICE.

GEORGE W. KING, HARRY J. BARNHART, AND CHARLES B. KING, OF MARION, OHIO, ASSIGNORS TO THE MARION STEAM SHOVEL COMPANY, OF MARION, OHIO, A CORPORATION OF OHIO.

BEARING.

SPECIFICATION forming part of Letters Patent No. 729,356, dated May 26, 1903.

Application filed February 7, 1903. Serial No. 142,298. (No model.)

*To all whom it may concern:*

Be it known that we, GEORGE W. KING, HARRY J. BARNHART, and CHARLES B. KING, citizens of the United States, residing in Marion, in the county of Marion and State of Ohio, have invented certain new and useful Improvements in Bearings, of which the following is a specification, reference being had therein to the accompanying drawings.

This invention relates to bearings, and has for its object to provide a bearing which is simple and inexpensive in construction, which can be readily put in place within its housing and as readily removed, and which will be securely held in position when in place.

To this end our invention consists in certain novel features, which we will now proceed to describe, and will then particularly point out in the claims.

In the accompanying drawings, Figure 1 is a side elevation of a structure embodying our invention in one form. Fig. 2 is an end elevation of the same. Fig. 3 is a sectional view, taken on the line $x\,x$ of Fig. 2. Fig. 4 is a side elevation of the bearing-sleeve or bushing detached and before the parts are turned end for end. Fig. 5 is an end view of what is shown in Fig. 4, and Fig. 6 is a view showing the position of the parts when the sleeve or bushing is in place in its housing.

Our present invention, although capable of general application, is devised more particularly for use in connection with the bearing of the shaft which operates the dipper-handle of steam-shovels. This shaft has a bearing within the yoke-block and is subjected to a constant pounding action from the dipper-handle, so that a cast-iron bearing is found to cut out very rapidly, while a babbitted bearing will crush out. Brass bushings have heretofore been used, but they have been held in place by means of dowels, which is an expensive and unsatisfactory construction. To overcome this objection, we employ a bushing of brass or other similar suitable material in the form of a sleeve 1, having formed on its exterior an annular rib 2, located nearer one end of the sleeve than the other. This sleeve is then split or cut in two longitudinally, as indicated at 3, so as to divide it in two equal halves. The housing for the sleeve or bushing is a two-part housing, also divided diametrically with respect to the opening in the sleeve 1, and in the present instance this housing consists of two members 4 and 5, which constitute the body of the yoke-block and which are held together by the yoke or U-shaped bolt 6. The members 4 and 5 of the housing are bored out between their meeting faces to form an opening between them having a diameter equal to the external diameter of the sleeve 1. In the wall of this opening, which is indicated by the reference-numeral 7, there is formed a groove or annular recess 8, corresponding in size and location with the rib 2 on the sleeve 1.

In assembling the parts one of the members 4 or 5 is turned end for end, and one of the two halves of the sleeve 1 is also turned end for end, as shown in Fig. 6, and the halves of the sleeve are then placed in position between the two members of the housing which receives them. It will be seen that when the parts are thus assembled the ribs on the sleeve-sections will not only prevent the sleeve-sections from moving longitudinally, but will also prevent them from turning in the housing, since the members are so reversed that the recesses in which the ribs fit extend only half-way around the opening in the housing in each case, and the ends of said recesses are closed by the body of the other member of the housing.

We have thus provided a simple, inexpensive, and efficient construction for securing the bearing-sleeve or bushing in position, the construction being such that the parts may be readily and quickly assembled and as readily taken apart, while the sleeve or bushing will be firmly and immovably held in place after having been put in position.

We do not wish to be understood as limiting ourselves to the precise details of construction hereinbefore described, and shown in the accompanying drawings, as it is obvious that these details may be varied without departing from the principle of our invention.

Having thus fully described our invention, what we claim as new, and desire to secure by Letters Patent, is—

1. In a bearing, the combination, with a housing having an opening for a bushing and divided diametrically with respect to said opening, each member of the housing being provided with a semicircular recess, of a split bushing, each member of which is provided with a rib to fit the corresponding recess, the recesses and ribs being located on opposite sides of the central transverse plane of the bearing, substantially as described.

2. In a bearing, the combination, with a two-part housing having an opening for a bushing and divided diametrically with respect to said opening, each member of the housing being provided with a semicircular recess, of a split bushing, each member of which is provided with a rib to fit the corresponding recess, the recesses and ribs being located on opposite sides of the central transverse plane of the bearing, and the members of the housing and of the bushing being reversible with respect to each other, substantially as described.

In testimony whereof we affix our signatures in presence of two witnesses.

GEORGE W. KING.
  HARRY J. BARNHART.
  CHARLES B. KING.

Witnesses:
 ROBERT G. LUCAS,
 WILLIAM R. SHISLER.